P. HAERST.
DUMPING HOPPER CART.
APPLICATION FILED JAN. 2, 1908.
946,430.
Patented Jan. 11, 1910.
3 SHEETS—SHEET 1.
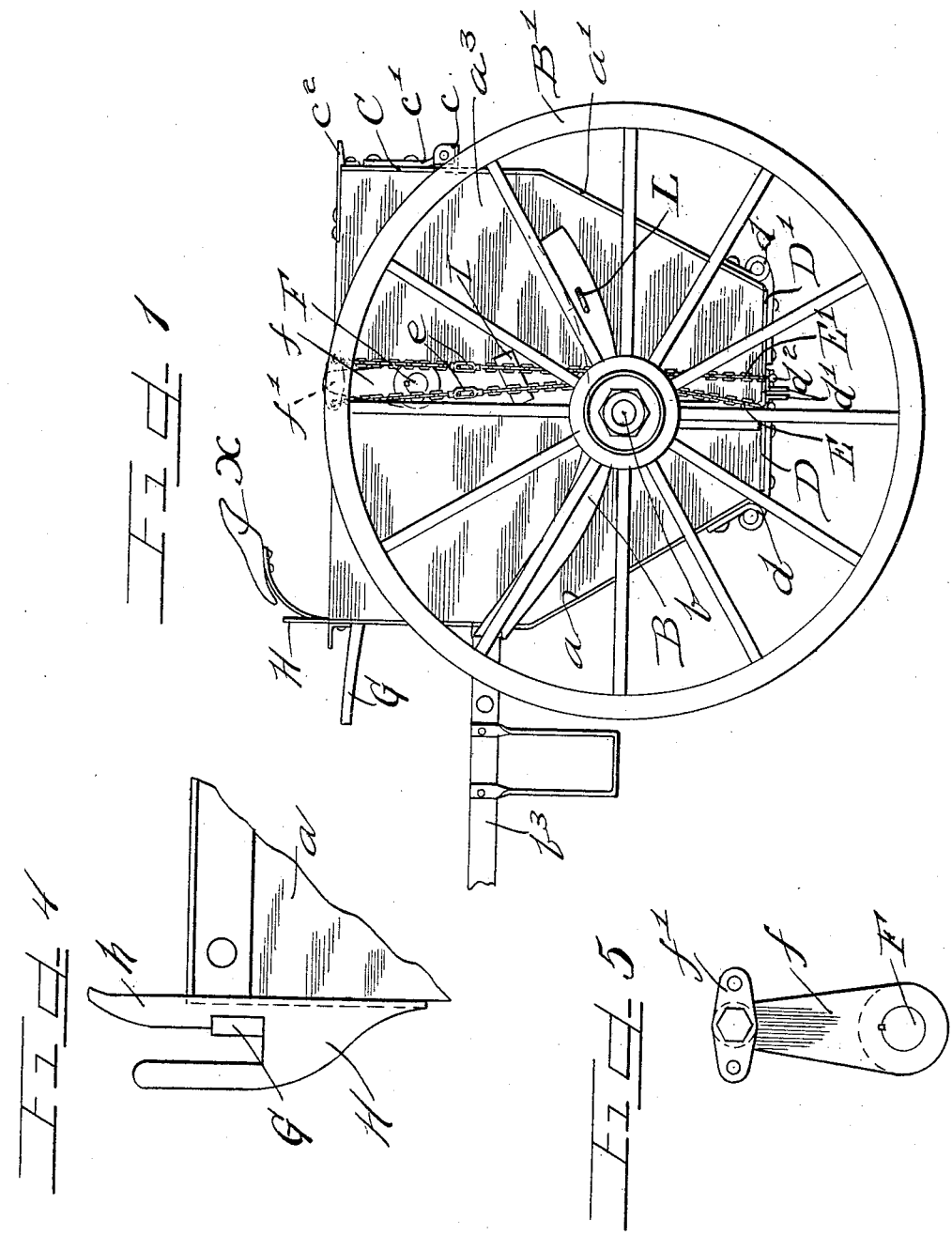

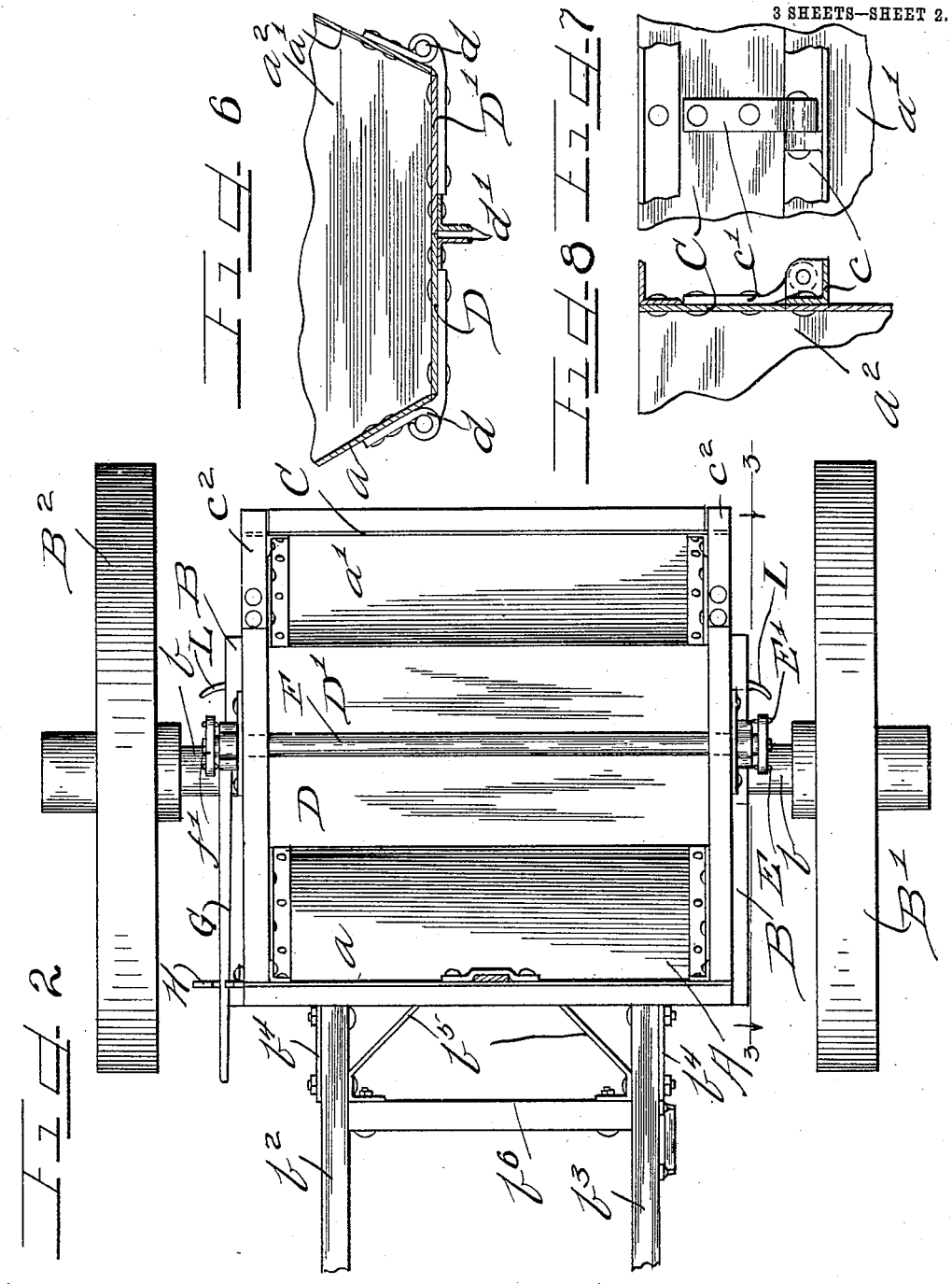

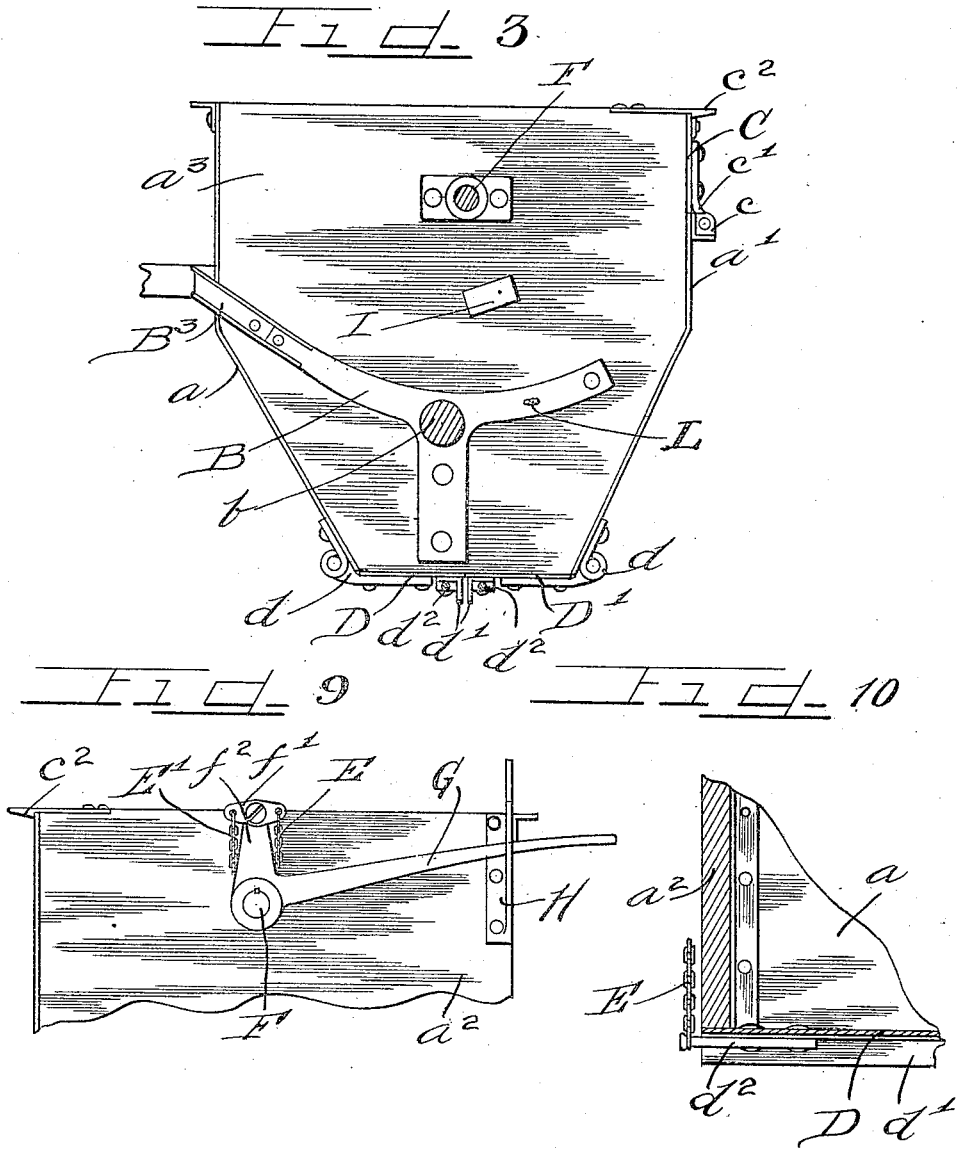

UNITED STATES PATENT OFFICE.

PIÈRRE HAERST, OF CHICAGO, ILLINOIS.

DUMPING HOPPER-CART.

946,430.

Specification of Letters Patent.

Patented Jan. 11, 1910.

Application filed January 2, 1908. Serial No. 408,897.

*To all whom it may concern:*

Be it known that I, PIÈRRE HAERST, a citizen of the United States, and a resident of Chicago, Cook county, Illinois, have invented certain new and useful Improvements in Dumping Hopper-Carts; and I do hereby declare that the following is a full, clear, and exact description of the same, reference being had to the accompanying drawings, and to the characters of reference marked thereon, which form a part of this specification.

This invention relates to improvements in dumping hopper carts.

Heretofore carts have usually been constructed in such a manner that the body is adapted to swing on its pivot for dumping purposes. Such carts are objectionable as the bodies often stick and in any event greater time is consumed in dumping and returning the body to normal than is desirable. Further to dump these carts it is necessary for the operator to leave his seat and tilt the bodies, which with loaded carts is often difficult and causes loss of time and the jerk and jar of the body both in dumping and righting cause an unnecessary strain on the draft animal.

It is an object of this invention to provide a cart having a hopper body adapted for street cleaning purposes or for handling any loose material.

It is a further object of this invention to provide a cart having a dumping bottom and novel mechanism for dumping said bottom which is operatable from the driver's seat.

It is a further object of this invention to provide a cart having a pivotal section adapted to be lowered when filling the cart and closed when the cart is full to prevent the material jarring from the cart when crossing rough streets or roads.

It is finally an object of this invention to provide an exceedingly strong and durable cart, cheap to construct and maintain and which may be dumped instantaneously.

The invention relates to the matters hereinafter described and more fully pointed out and defined in the appended claims.

In the drawings: Figure 1 is a side elevation of a device embodying my invention. Fig. 2 is a top plan view thereof. Fig. 3 is a side elevation taken on line 3—3 of Fig. 2 with parts omitted. Fig. 4 is an enlarged fragmentary detail illustrating the locking means for the dumping lever. Fig. 5 is an enlarged detail of a part of the dumping mechanism. Fig. 6 is an enlarged transverse section of the dumping sections or bottom. Figs. 7 and 8 are enlarged fragmentary details of the pivotal lowering door or section. Fig. 9 is an enlarged fragmentary detail of the dumping lever and mechanism. Fig. 10 is an enlarged fragmentary detail illustrating one manner of securing the chains to the dumping sections.

As shown in the drawings: A indicates the body of the cart which may be constructed of sheet metal or wood or any other preferred material. Said body is constructed in hopper form and comprises front and rear walls $a$—$a'$ which are vertical for a suitable length and from approximately half the depth of the body said walls converge downwardly and inwardly at a suitable angle and side walls $a^2$—$a^3$ rigidly connect said front and rear walls.

Rigidly secured to each side of the body is a brace strap or bar B, integral with which are the axles $b$ adapted to pivotally support the body on the wheels B'—B². A brace bar or strap B³ connects the forward ends of the bar B, and extends across the front of the body as shown in Fig. 3. Thills $b^2$—$b^3$ at their inner ends are rigidly engaged to said brace bar B³ by means of bars $b^4$ and $b^5$ which are bolted or otherwise secured to the thills and brace bar. A cross bar $b^6$ connects the thills in rigid relation and the outer ends of the bars $b^5$ are secured thereto. Normally forming part of the rear wall $a'$ of said body is a section or door C, which is pivoted by means of suitable hinges $c'$ to an angle bar $c$, secured to the top of the rigid wall $a'$. Any suitable catch $c^2$ (in this instance shown as a spring catch) is engaged to each of the side walls and locks the hinged section in closed position.

Pivoted to the lower end of the front and rear walls of the body by means of hinges $d$ are dumping bottom sections D—D' each of which at their inner meeting edges is provided with an angle bar $d'$ to strengthen the same. A rod or bar $d^2$ is rigidly engaged to the bottom of each dumping section at each end thereof and extends outwardly beyond the body of the cart and chains E—E' are engaged at their lower ends to the outer ends of said rods.

Journaled in suitable bearings in the upper part of the side walls of the body is a shaft F, to one end of which outside the body is rigidly secured an upwardly directed crank or arm $f$. A link $f'$ is pivoted to the upper end of said crank to the ends of which the chains E—E' are engaged and each chain, as shown, is provided with a turn buckle $e$, by means of which the tension may be varied at each end of each section.

To the opposite end of the shaft F outside the body a crank or arm $f^2$ is rigidly secured which is provided with a link and chain connection as before described and a lever G integral with the lower end of the crank $f^2$ extends forwardly in position to be actuated by the operator on the seat X. A lock or catch H is rigidly engaged to the front of the side wall $a^2$ which comprises a plate slotted to receive the lever therein and a notch is provided at the lower end of the slot into which the lever springs after moving over the cam face $h$.

Stops I are provided to limit the movement of each crank or arm in dumping and a finger or hook L is provided on each brace bar B or other convenient and suitable position on the side walls which engages the chains as the cranks swing outwardly, limiting the outward movement thereof thus insuring the chains pulling inwardly on the sections when closing.

The operation is as follows: The cart is adapted for one or more draft animals and owing to the shape of the body the same holds a maximum quantity of material with minimum length thus occupying small space. In dumping, the operator simply releases the lever from the lock or catch and the weight of the material on the bottom sections automatically opens said bottom sections by gravity to empty the cart. It is thus seen that the cart may be dumped without necessitating the operator leaving his seat and further the operator is relieved of the labor of dumping the cart as it is only necessary to throw the lever out of the catch. The stops limit the movement of the cranks and not only prevent the lever swinging beyond the reach of the operator for closing the bottom sections but prevent the cranks swinging out of operative position. Also the fingers of any other equivalent stops prevent the chains swinging outwardly sufficiently for the rear chain to elevate its section outwardly i. e. in the wrong direction.

In filling the cart the rear door or pivotal section is lowered which saves considerable labor by reducing the height necessary to elevate the material and after the cart is filled by closing the section the material is prevented from jarring out or spilling as a space is provided to receive this material which would otherwise be scattered on the street.

The flexible operating mechanism shown is highly efficient and easily operated and the length may be adjusted to vary the tension thereby always insuring the dumping sections closing tight, but pivotal connecting bars or links may be employed if desired. Many details of construction may be varied without departing from the principles of this invention and I therefore do not desire to limit this application for patent otherwise than necessitated by the prior art.

I claim as my invention:

1. A cart embracing a hopper body, dumping sections hinged at the lower end of the front and rear walls of said body, a dumping shaft rotatably secured to the body, flexible members connected with the sections and with the shaft and all of said members adapted to swing rearwardly to dump the sections, and means limiting the rearward swing of the flexible members.

2. A cart comprising a body, a dumping bottom therefor comprising swinging sections, a shaft journaled above said sections, a link pivotally connected with each end of the shaft, flexible connections connecting said links and the appropriate ends of the dumping sections outside of the body of the cart, means for operating the shaft and means limiting the rearward movement of the flexible connections.

3. A cart having the body constructed of sheet metal, metallic bottom sections hinged to the cart to swing downwardly and oppositely, rods secured to each hinged section extending outwardly from the body, flexible members connected to the rods at one end, pivotally supported members connected with the flexible members, means for swinging the flexible members outwardly and downwardly to open the sections and means for engaging the flexible members intermediate the ends adapting the same to freely move vertically but preventing the flexible members swinging outwardly beyond the pivot for the rear section.

4. In a device of the class described the combination with a hopper body of dumping sections pivoted to the lower end thereof, a shaft journaled longitudinally of the dumping sections, a crank on each end thereof, a link pivoted to each crank, flexible devices engaged at corresponding ends to opposite ends of the links and each connected at its opposite end with one of the dumping sections, a lever for actuating the shaft and means rigidly secured to the body of the cart for engaging one of the cranks and limiting the movement of said cranks and lever.

5. In a device of the class described a body, a dumping bottom therefor comprising sections, a shaft journaled transversely of the body, a crank or arm on each end thereof, flexible members each engaged at one end to the appropriate sections, means pivotally connecting the flexible members and cranks, coacting stops on each side of the body, one for limiting the movement of the respective crank and the other for limiting the rearward swing of the respective flexible member in opening, means for adjusting the tension of the flexible members and means for actuating the shaft for operating the dumping bottom.

6. In a device of the class described a body, a dumping bottom therefor, a shaft journaled transversely of the body, a crank or arm on each end thereof, flexible members engaged at one end to the dumping bottom, a link pivoted to each crank and connecting the appropriate flexible members thereto, means for adjusting the tension of the flexible members and means for actuating the shaft and releasing the dumping bottom to open by gravity.

7. A cart comprising a body having downwardly and inwardly converging lower walls, a brace bar rigidly engaged to each side of the body, an axle integral with each brace bar, wheels pivotally supporting the body, dumping sections for said body, dumping mechanism for actuating said sections, means limiting the movement of said dumping mechanism and a section pivoted to the body adapted to be lowered in filling and raised after filling.

In testimony whereof I have hereunto subscribed my name in the presence of two subscribing witnesses.

PIÈRRE HAERST.

Witnesses:
  K. E. HANNAH,
  LAWRENCE REILESTEIN.